US010942837B2

(12) United States Patent
Vidal et al.

(10) Patent No.: US 10,942,837 B2
(45) Date of Patent: Mar. 9, 2021

(54) ANALYZING TIME-SERIES DATA IN AN AUTOMATED APPLICATION TESTING SYSTEM

(71) Applicant: Sauce Labs Inc., San Francisco, CA (US)

(72) Inventors: Fernando Vidal, Oakland, CA (US); Benjamin H Ellis, Emeryville, CA (US)

(73) Assignee: Sauce Labs Inc., San Francisco, CA (US)

( * ) Notice: Subject to any disclaimer, the term of this patent is extended or adjusted under 35 U.S.C. 154(b) by 25 days.

(21) Appl. No.: 16/410,778

(22) Filed: May 13, 2019

(65) Prior Publication Data
US 2020/0364133 A1 Nov. 19, 2020

(51) Int. Cl.
G06F 11/36 (2006.01)
G06F 11/34 (2006.01)
G06F 9/455 (2018.01)

(52) U.S. Cl.
CPC ...... G06F 11/3616 (2013.01); G06F 9/45558 (2013.01); G06F 11/3419 (2013.01); G06F 11/3452 (2013.01); G06F 11/3664 (2013.01); G06F 2009/45595 (2013.01)

(58) Field of Classification Search
USPC ........................................................ 717/124
See application file for complete search history.

(56) References Cited

U.S. PATENT DOCUMENTS 9,075,914 B2   7/2015 Huggins
9,170,847 B2  10/2015 Huggins et al.
10,484,301 B1 * 11/2019 Shukla ............... H04L 41/0896
10,643,138 B2 *  5/2020 Bellala .................... G06N 5/04
2005/0234762 A1 * 10/2005 Pinto ..................... G06Q 30/02
                                                           700/44
2005/0278703 A1 * 12/2005 Lo ....................... G06F 11/0751
                                                           717/126

(Continued)

FOREIGN PATENT DOCUMENTS

DE   10 2012 223 587   7/2014
WO   WO 2016/178661   11/2016
WO   WO 2017/023299    2/2017

OTHER PUBLICATIONS

Vegard Flovik; "How (Not) to Use Machine Learning for Time Series Forecasting: Avoiding the Pitfalls"; Towards Data Science (.com) website [full url in ref.]; Jun. 7, 2018 (Year: 2018).*

(Continued)

Primary Examiner — Wei Y Zhen
Assistant Examiner — Clint Thatcher
(74) Attorney, Agent, or Firm — Weaver Austin Villeneuve & Sampson LLP

(57) ABSTRACT

Methods and apparatus are described by which time-series data captured during the automated testing of software applications may be analyzed. Change-point detection is used to partition the time-series data, and an expected variance of data within each partition is determined. Because the partitioning of the test data provides a high level of confidence that the data points in a given partition conform to the same distribution, data points that represent meaningful changes in application performance can be more confidently and efficiently identified.

25 Claims, 4 Drawing Sheets

(56) References Cited

U.S. PATENT DOCUMENTS

| | | | | |
|---|---|---|---|---|
| 2010/0131928 | A1* | 5/2010 | Parthasarathy | G06F 11/3664 |
| | | | | 717/126 |
| 2011/0202901 | A1 | 8/2011 | Givoni et al. | |
| 2014/0282425 | A1 | 9/2014 | Zhao et al. | |
| 2014/0310235 | A1* | 10/2014 | Chan | G06F 11/3003 |
| | | | | 707/603 |
| 2017/0083572 | A1* | 3/2017 | Tankersley | G06F 3/04847 |
| 2017/0293551 | A1 | 10/2017 | Shani et al. | |
| 2018/0046926 | A1* | 2/2018 | Achin | G06N 5/02 |
| 2018/0300737 | A1* | 10/2018 | Bledsoe | G06F 16/248 |
| 2018/0324199 | A1* | 11/2018 | Crotinger | G06F 16/248 |
| 2019/0312800 | A1* | 10/2019 | Schibler | G06F 9/45558 |

OTHER PUBLICATIONS

González-Vidal, et al.; "BEATS: Blocks of Eigenvalues Algorithm for Time Series Segmentation"; IEEE Transactions on Knowledge and Data Engineering, vol. 30 No. 11 (pp. 2051-2064); Nov. 1, 2018 (Year: 2018).*

Mukhoti et al.; "Knowledge Extraction from a Time-Series Using Segmentation, Fuzzy Matching and Predictor Graphs"; 2016 IEEE International Conference on Fuzzy Systems (FUZZ-IEEE) (pp. 1201-1208); 2016 (Year: 2106).*

Lisa Sullivan and Wayne LaMorte; "InterQuartile Range (IQR)"; Boston University Medical Center website (sphweb.bumc.bu.edu) [full url in ref.]; May 17, 2016 (Year: 2016).*

James Tunnell; "Using Time Series Models for Defect Prediction in Software Release Planning"; Master's Thesis, Central Washington University; 2015 (Year: 2015).*

Arie van Deursen; "Beyond Page Objects: Testing Web Applications with State Objects"; ACM Queue vol. 13, Iss. 6; Jun. 16, 2015 (Year: 2015).*

"Change Detection"; Wikipedia.org website; Jul. 6, 2018 (Year: 2018).*

Killick, et al., "Optimal Detection of Changepoints with a Linear Computational Cost," Oct. 10, 2012.

U.S. Appl. No. 15/916,136, filed Mar. 8, 2018, Bromann et al.

U.S. Appl. No. 15/973,019, filed May 7, 2018, Vidal et al.

PCT International Search Report and Written Opinion dated Aug. 20, 2020 issued in PCT/US2020/031902.

* cited by examiner

ANALYZING TIME-SERIES DATA IN AN AUTOMATED APPLICATION TESTING SYSTEM

BACKGROUND

The testing of software applications is a critical bottleneck in the pipeline between developers and end users. The diversity of devices, operating systems, and web browsers, coupled with the rapid pace at which new versions of each become available, makes it extremely difficult to ensure compatibility and reliable operation of a new application with a significant portion of the possible combinations in a timely manner.

Even with testing platforms having a high degree of automation and parallelism, test run data are inherently noisy. For example, much of the variation in test results over time can be attributed to factors that are unrelated to the performance of the application under test, e.g., fluctuations in available network bandwidth. Many troubleshooting techniques for determining whether changes in test data are meaningful remain relatively unsophisticated, often relying on developer experience and intuition. Such activities therefore represent significant inefficiencies in the automated testing of software applications.

SUMMARY

According to various implementations, methods, apparatus, systems, platforms, and computer program products are provided that support automated testing of applications. According to a first class of implementations, first time-series data for an application under test (AUT) are received. The first time-series data include a data point representing a first performance metric for each of a plurality of first test runs of one or more versions of a test for one or more versions of the AUT. The first time-series data are partitioned into one or more partitions using change-point detection. Each partition represents a corresponding range of the first time-series data belonging to a corresponding probabilistic distribution. Outliers of the data points in each partition are filtered, thereby resulting in remaining data points in each partition. A range of expected behavior is determined for the first performance metric for a first partition of the one or more partitions based on the remaining data points of the first partition. A plurality of second test runs is evaluated based on the range of expected behavior for the first partition.

According to a specific implementation, second time-series data for the AUT are received. The second time-series data include a data point representing the first performance metric for each of the second test runs. One or more data points of the second time-series data are identified that depart from the range of expected behavior for the first partition. According to a more specific implementation, a change-point candidate is identified from among the one or more data points of the second time-series data that depart from the range of expected behavior for the first partition. According to an even more specific implementation, a second partition of the second time-series data is identified based on the change-point candidate. A range of expected behavior for the first performance metric is determined for the second partition. A plurality of third test runs is evaluated based on the range of expected behavior for the second partition.

According to a specific implementation, the outliers of the data points in each partition are filtered using interquartile range filtering.

According to a specific implementation, the range of expected behavior for the first performance metric for the first partition is determined by determining a standard deviation band based on the remaining data points.

According to a specific implementation, the plurality of first test runs is conducted by allocating resources. The resources include a plurality of virtual computing environment (VCE) instances. Each VCE instance corresponds to a device operating system (OS). According to a more specific implementation, the device OS for a first VCE instance is a personal computer OS, and the first VCE instance also corresponds to a web browser configured to interact with a corresponding instance of the AUT. According to another more specific implementation, the device OS for a first VCE instance is a mobile device OS, and the first VCE instance also corresponds to a hardware device configured to operate with the mobile device OS. According to yet another more specific implementation, the device OS for a first VCE instance is a mobile device OS, and the first VCE instance also corresponds to a mobile device emulator configured to emulate the mobile device OS.

A further understanding of the nature and advantages of various implementations may be realized by reference to the remaining portions of the specification and the drawings.

DETAILED DESCRIPTION

Reference will now be made in detail to specific implementations. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure as defined by the appended claims. In addition, specific details may be provided in order to promote a thorough understanding of the described implementations. Some implementations within the scope of this disclosure may be practiced without some or all of these details. Further, well known features may not have been described in detail for the sake of clarity.

The present disclosure describes techniques for monitoring and/or analyzing test results data captured during the automated testing of software applications. According to a various implementations, time-series data are captured across multiple test runs for an application under test (AUT). The time-series data are partitioned using change point detection to identify one or more partitions or ranges of the test data, each of which conforms to a particular probabilistic distribution. Outliers within each range are then filtered. An expected variance of data within each partition is determined based on the remaining data points. Because the partitioning of the test data provides a high level of confidence that the data points in a given partition conform to the same distribution, data points within a partition but outside the expected variance can be evaluated, filtered, or ignored with a high degree of confidence that they don't represent a meaningful change in the AUT's performance. Moreover, a high degree of confidence is also associated with the identification of meaningful transitions in the test data, i.e., at partition boundaries. In this way, data points that represent meaningful changes in application performance can be more confidently and efficiently identified.

Figure 1:
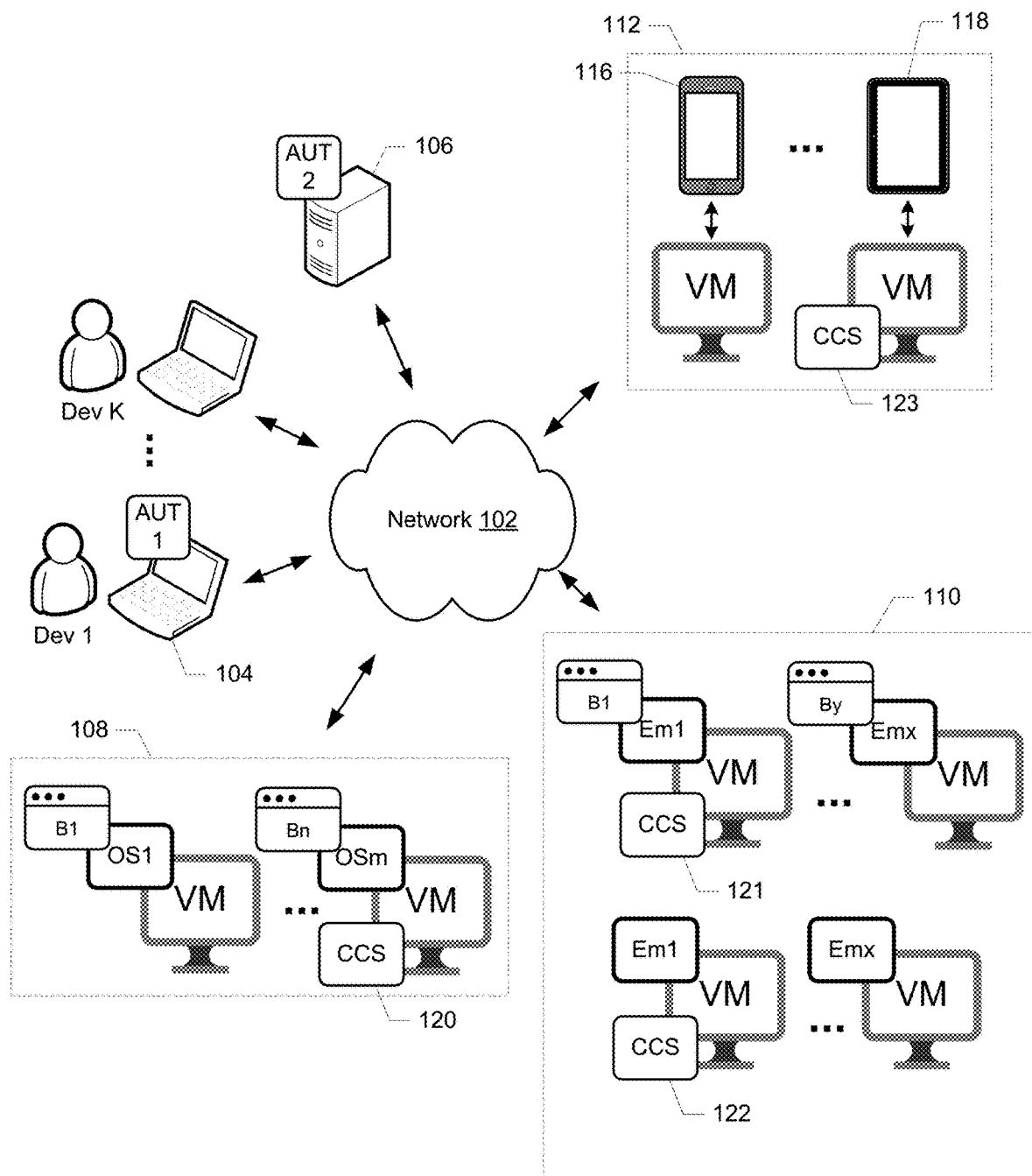
FIG. 1 is a simplified diagram of a computing system in which implementations enabled by the present disclosure may be practiced.

FIG. 1 depicts a computing environment in which application developers test their applications using resources on a cloud-hosted testing platform via network 102. Developers Dev 1 through Dev K represent a diverse community that may include anything from an individual developer on a single laptop to a team of developers on a wide area network at a large enterprise. The applications under test (AUTs) may reside on the same machine with which the developer is interacting with the test platform (e.g., as represented by AUT 1 on laptop 104), or on a separate machine (e.g., as represented by AUT 2 on server 106). The AUTs may be hosted in the public cloud with minimal security, or behind the enterprise-grade security of an enterprise network.

The virtual and hardware resources of the application testing platform are depicted in FIG. 1 as being include in resource pools 108-112. Resource pool 108 represents resources for testing web applications on potentially hundreds of browser and operating system (OS) combinations as represented by various combinations of browsers B1-Bn and operating systems OS1-OSm on corresponding virtual machine (VM) instances. These VM instances may represent, for example, Windows, Mac, and Linux-based machines to name some representative examples.

Resource pool 110 represents resources for testing mobile web applications on potentially hundreds of mobile browser and mobile device emulator combinations as represented by various combinations of mobile browsers B1-By and emulators Em1-Emx on corresponding VM instances, and resources for testing native mobile applications on potentially hundreds of mobile device emulators as represented by emulators Em1-Emx on corresponding VM instances. The depicted emulators may represent, for example, iOS Simulators and Android Emulators to name some representative examples. And while the emulators are showns as operating on corresponding VMs, the developer will typically primarily interact with or automate on the emulators.

Resource pool 112 represents resources for testing both mobile web applications and native mobile applications on potentially hundreds of hardware mobile device types as represented by smart phone 116 and tablet 118 and the corresponding VM instances that manage the interaction with a corresponding mobile device during testing. The depicted devices may represent, for example, physical phones or tablets for Android and iOS to name some representative examples.

It should be noted that the test platform of FIG. 1 and other examples described herein show the use of VMs for exemplary purposes. It will be understood that other mechanisms for providing isolation among applications operating in a shared computing environment are contemplated to be within the scope of the present disclosure. Such other mechanisms include, for example, containers such as those provided by Docker, Inc., or CoreOS, Inc., both of San Francisco, Calif. The present disclosure will refer generally to VMs, containers, and other suitable mechanisms for providing isolation among applications in a computing environments as "virtual computing environment instances" or "VCEs." The present disclosure should therefore not be limited by reference to specific examples using VMs.

The platform supports a wide range of application testing use cases. A single developer might use the platform to manually run a single test of an AUT with one combination of testing resources. At the other end of the scale, a team of developers associated with a large enterprise can implement an automated testing framework at scale, running multiple tests of multiple AUTs on many different combinations of testing resources simultaneously. And depending on the AUT and the goals of a particular test, there may be one or many instances of the AUT with which the platform interacts for that test. The platform may also include control/capture services (e.g., CCS's 120-123 operating on respective VMs) that are capable of connecting with, exerting varying degrees of control over, and/or capturing state information from the platform's testing resources and/or the AUTs for correlation with other test-related information.

As will be appreciated, the depiction of resource pools 108-112 is for illustrative purposes. More generally, the application testing platform may conform to any of a wide variety of architectures including, for example, one or more platforms deployed at one or more co-locations, each implemented with one or more servers. Network 102 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, and so on. The computing devices with which developers connect to the testing platform may be any suitable device capable of connecting to network 102 and interacting with the testing resources.

Some implementations enabled by the present disclosure are based on computing models that enable ubiquitous, convenient, on-demand network access to both virtual and hardware resources from one or more shared pools of computing resources (e.g., mobile devices, virtual machines, containers, emulators, networks, servers, storage, applications, services, etc.). Virtual resources are thoroughly torn down or wiped and hardware resources thoroughly wiped once testing is complete to ensure the security of each developer's data. As will be understood, such computing resources may be integrated with and/or under the control of the same entity controlling the testing platform. Alternatively, such resources may be associated with other platforms that are at least partially controlled by other entities, e.g., a platform under control of a separate provider of cloud services and/or computing resources with which the testing platform and/or the developer connects to consume resources as needed. In another example, a developer or an enterprise might run their own cloud or cluster of computing devices such as, for example, a Kubernetes cluster, the documentation for which is distributed by the Linux Foundation®. Based on the foregoing, the diversity of variations within the scope of this disclosure will be appreciated by those of skill in the art.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

Figure 2:
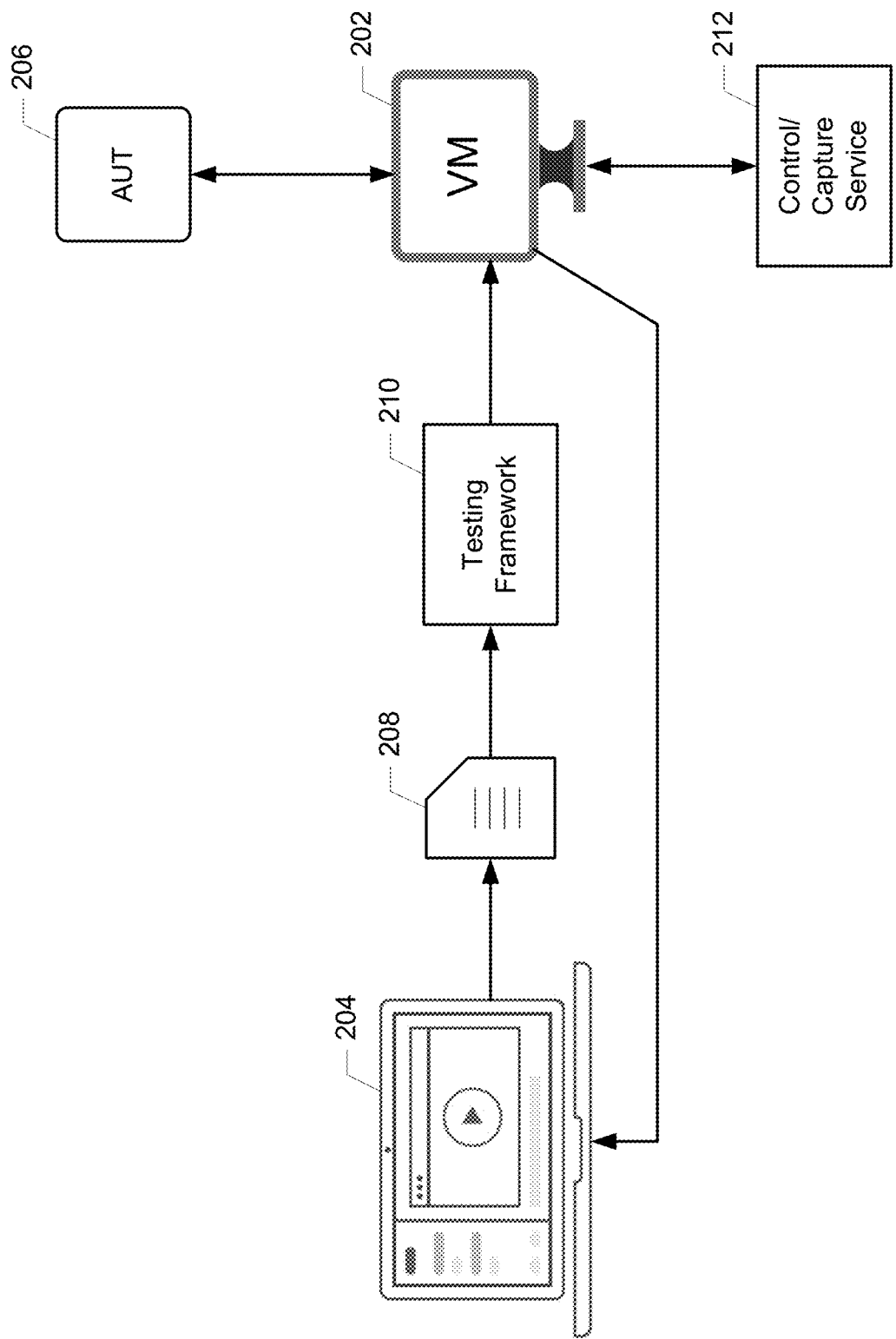
FIG. 2 illustrates interactions between a software developer and an application testing platform.
Figure 3:
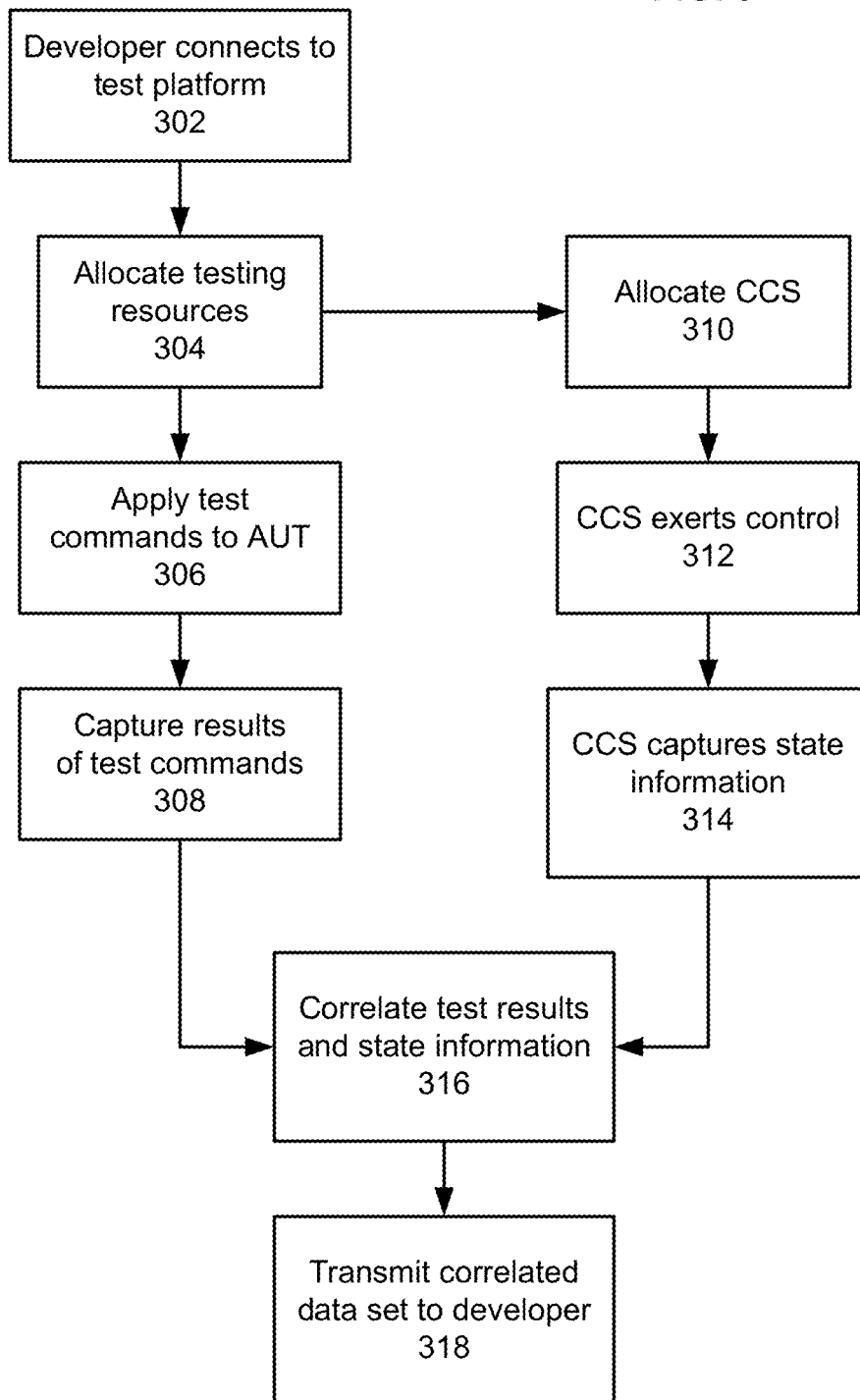
FIG. 3 is a flowchart illustrating operation of a particular implementation.

Referring now to the diagram of FIG. 2 and the flowchart of FIG. 3, a developer interacts with test resource(s) 202 (depicted in FIG. 2 as a VM instance) of a remote testing platform (302) via a test console interface (e.g., a web interface) on laptop 204 in which the developer can select the types of resource(s) with which an AUT 206 is to be tested. In response to the developer's selections, test resources 202 are allocated to that developer's test(s) (304). Interaction with test resources 202 may also be facilitated via a programmatic interface, e.g., a REST interface, (not shown) that might be used, for example, in the context of large-scale, automated testing. The developer develops test script 208 for the AUT in any of a variety of common languages (e.g., Ruby, PHP, JavaScript, or .NET), and the test commands are applied to AUT 206 (306) via VM instance 202 using any of a variety of automation software and/or testing frameworks (e.g., 210) including, for example, various automation drivers, Selenium and WebDriver for web application testing, and Appium, Espresso, XCUItest (Xcode), and Robotium for mobile application testing, etc.

The test scripts may be run on the developer's machine/network, on a remote machine (e.g., a continuous integration/continuous development (CI/CD) system), or by a remote service. The resulting commands are sent to the selected resources via a secure, two-way proxy server connection (e.g., a secure HTTP tunnel). There is also a secure two-way connection via proxy server from the selected testing resources to the AUT, wherever that resides. For example, if the AUT is a web application, VM instances with various browser/OS combinations specified by the developer are allocated from a pool or, if not available, instantiated. Secure HTTP tunnels to both the developer's machine and the AUT are established for each VM. Selenium commands generated by the developer's test script are applied (e.g., via an external driver) to each browser via one tunnel, and the browser then interacts with the AUT in a corresponding way via the other tunnel. As will be appreciated, while the use of highly secure connections may be preferable in some circumstances, implementations are contemplated in which different levels of security are used.

The results of the application of the test commands are captured (308) for eventual transmission back to the developer's device or network (as described below) for reviewing and/or further processing, e.g., via the test console interface. The captured test results may include the commands and responses (e.g., Selenium or Appium logs), as well as video or screen shots of the browser UI and/or AUT after each page-altering command. These results are correlated in time and stored (e.g., in cloud storage such as Amazon's Simple Store Service (S3) buckets) before the VM instance and any other resources are torn down or wiped. As discussed below, these test results may be supplemented with additional information captured via another connection.

According to various implementations enabled by the present disclosure, and as illustrated in FIG. 2, a CCS 212 is allocated (310) and interacts with one or more of the AUT and/or the allocated testing resources (e.g., the VM instance, container, browser, OS, emulator, mobile device, etc.) via another two-way connection to exercise control over (312) and/or capture information from (314) the testing resource(s) in a way that does not significantly interfere with the test(s) being conducted. For the purpose of clarity, CCS 212 is shown in the figure as being distinct from VM instance 202. However, it should be noted that, while such implementations are contemplated, implementations are also contemplated in which CCS 212 operates on the VM instance. An example will be instructive.

This example relates to a particular class of implementations and assumes that the AUT is a web application, that the testing resource of the testing platform is a particular browser/OS combination operating on a VM instance, and that the testing framework is an open source framework using a Selenium library. It will be understood however that these assumptions are merely for the purpose of illustration. For example, this class of implementations includes frameworks that don't necessarily need to use a Selenium library such as, for example, any framework based WebDriver, an interface that enables the remote control of web browsers as described in W3C Candidate Recommendation 14 Feb. 2018, the entire disclosure of which is incorporated herein by reference for all purposes. It should also be noted that, while only one test instance is shown, the described interactions among the components of the test system may be performed substantially simultaneously at scale across many test instances.

As will be appreciated, there is a significant amount of traffic between a browser and the servers with which it interacts, e.g., communications with remote assets via REST calls initiated by JavaScript embedded in the page html. Failures often relate to these communications rather than the logic of the page itself (e.g., the server never responds, responds after a timeout, or returns an error response). These types of failures contribute to what is commonly referred to as "test flake," i.e., intermittent failures due to the fact that test success or failure is not purely deterministic. As will also be appreciated, it is often difficult to determine whether a pattern of failures represents a real problem or can be safely ignored. Because of this, dealing with test flake represents a significant expenditure of troubleshooting resources and often results in arbitrary solutions, e.g., labeling something a failure only if it fails in some arbitrary way, e.g., twice in a row.

Browsers like Internet Explorer from Microsoft, Chrome from Google, Firefox from Mozilla, and Safari from Apple have associated application programming interfaces (APIs) that enable debugging functionality (e.g., using developer tools) and execution of automation commands (e.g., by automation drivers such as ChromeDriver or Geckodriver). Developer tools provide visibility on various browser communications and other performance data that can be accessed via a developer tools menu, e.g., by right-clicking on a page and selecting "Inspect" or "Inspect element." For example, a "Console" view provides a running list of requests (e.g., actions taken, links selected, etc.) and associated errors. In another example, a "Performance" view provides information about the use of various resources (e.g., network bandwidth, memory, CPU, etc.). Such "dev tools" are used by web developers to test and troubleshoot the pages of a web site under development. However, the use of these tools is typically limited to local testing by one developer using one browser on one web page at a time. Moreover, acquisition of the various types of information available in the dev tools menu is typically achieved through manual inspection by the developer. The test platform described above allows developers to perform tests of applications on many different browser/OS combinations simultaneously. However, as will be appreciated, this type of large-scale testing does not lend itself to the conventional, manual use of dev tools.

Conventional browser testing involves the execution of commands within a browser using, for example, an open source framework and the appropriate automation driver. In conjunction with this, and without interfering with the application of the test commands, a control/capture service (e.g., CCS 212) connects to the browser over a TCP interface that is defined in the dev tools protocol of the browser, controls use of the tools in specified ways, and captures information for correlation with the information in the test logs and/or screen shots or video of the browser interface. The information captured can relate to any of the information generated or made accessible by the browser engine (e.g., Blink for Chrome or Gecko for Firefox) using the dev tools interface defined by the dev tools protocol, e.g., back-end calls and responses, browser performance, memory usage, security audits, DOM tree snapshots, etc. The information captured can also include information made available by the VM or container itself such as, for example, CPU or memory usage, traffic across the NIC, etc. That is, in addition to conventional (e.g., Selenium-based) testing, the CCS allows the developer to access browser features or VM/container information in an automated way that allows more customized control of the browser or VM/container, and the collection of a much richer information set in connection with the tests being executed.

As mentioned above, web browser specifications provide for establishing high-level two-way interfaces for automating interaction with the browser using external drivers. A testing framework based on WebDriver uses such interfaces to apply test commands. Such interfaces allows for integration with the dev tools using such a two-way interface, e.g., the Chrome DevTools Protocol from Google allows for tools to instrument, inspect, debug, and profile Chrome browsers. Instrumentation is divided into a number of domains (e.g., DOM, debugger, network, etc.), each of which defines a number of commands it supports and events it generates. Similarly, the Mozilla debugging protocol allows an external service to connect to a Firefox browser, discover what sorts of things are present to debugging or inspection, select JavaScript threads to watch, and observe and modify their execution. The protocol provides a unified view of JavaScript, DOM nodes, CSS rules, and the other technologies used in web applications.

For older browser versions that only allow one connection to the internal browser debugging interface, a time-based multiplexer may be employed to allow WebDriver test commands and the control/capture service communications to occur during the same test. More current browser versions that allow multiple simultaneous driver connections do not require this.

The connection via the browser's API may be a two-way connection that allows the developer to control the browser in an automated way, e.g., to enable or disable specific browser functionality in conjunction with the tests they design (Selenium-based or otherwise). This may be done, for example, with a set of controls specified on the developer's test console interface that are then imposed in parallel with the tests at scale across all relevant browser/OS combinations and VM instances. When the tests are complete, the captured information is stored (e.g., uploaded to an S3 bucket like any other log file) and correlated in time with the other information generated by the tests (316), e.g., command/results and screen shots/video. All or some portion of this correlated data set may then be transmitted to the developer's device for presentation in any of a wide variety of ways (318).

As will be appreciated, there is a great diversity of browser control and information capture enabled by this automated integration with browser dev tools. For example, a developer can specify that a performance check should be conducted in conjunction with the application of a particular command or sequence of commands. The performance information generated by the browser can then be captured for manual review and/or support of a variety of functionalities. In another example, a network request made by the browser could be intercepted and/or the response modified (e.g., by redirecting or specifying a custom response). In another example, network capabilities of the target environment (mobile device or browser) could be emulated. In yet another example, CPU and other platform specific capabilities could be emulated. Information that might be captured includes, network events, application states (e.g., DOM tree), resource usage (e.g., CPU and I/O utilization on mobile devices), page lifecycles (e.g., timings on when something was loaded or intractable), etc. From these example, those of skill in the art will appreciate great diversity of the kinds of control and information capture enabled by the present disclosure.

Thus, according to this class of implementations, browser APIs are leveraged to harvest a rich information set, and make that information available to developers after tests across many browser instances are complete. The availability of this data supports correlating specific performance data with test success or failure, and flagging specific correlations to developers. For example, a correlation between the response times of back-end calls and success or failure might support a determination that a test fails only when a particular back-end call takes more than some period of time. In another example, multiple back-end calls might get fired off in parallel and there might be an order in which the responses are typically received (e.g., based on how processing intensive each is). However, occasionally, the responses might be received in a different order which causes a failure. The availability of the correlated information set as enabled by the present disclosure allows for the detection of this kind of dependency; a dependency that would otherwise be nearly impossible to detect in automated testing. As will be discussed, not only does this enable the behavior of a particular browser or testing resource to be surfaced, it also enables the abstraction of data across many instances.

The browser engines and dev tools APIs for mobile web browsers are similar to those for other computing devices, and so the control and capture functionality described above with reference to traditional (e.g., desktop/laptop) web browsers may be achieved in similar fashion. It should be noted, however, that there may be some cases in which additional measures need to be taken to facilitate the communications. For example, for a Chrome browser running on an Android operating system, the Android Debug Bridge (ADB) connection may need to be multiplexed between Chromedriver and the browser running in the emulator. More generally, and as will be appreciated, a specific browser and operating system combination (whether mobile or not) may require additional measures that are specific to the combination to achieve at least some of the control and capture functionality described herein, but which are within the skill of those in the art.

According to some implementations, access to a browser for the purpose of capturing test-related information may be achieved by mechanisms other than a browser API. For example, a CCS could be configured to interact with a browser in an automated way that mimics the types of interactions that a developer might have with the browser.

Another example relates to another class of implementations and assumes that the AUT is a native application for a mobile device, that the testing resource of the testing platform is the operating system of an actual hardware mobile device interacting with a VM instance or an emulator of a mobile device operating system on a VM instance, and that the testing framework is an open source framework using Appium. It will be understood however that these assumptions are merely for the purpose of illustration. For example, implementations in this class might use native libraries such as those associated with Xcode (from Apple) or Android debug bridge (ADB) to capture state information.

The same basic architecture and work flow illustrated in FIGS. 2 and 3 can be used to capture state information about a native application under test, whether the test resources correspond to an actual hardware mobile device or an emulator. Conventional automated test results can be acquired from the Appium logs. A control/capture service that facilitates generation and capture of a richer data set (e.g., CCS 212) may be implemented using integration tools that enable integration with OS automation engines such as, for example, those provided by Google (for Android) and Apple (for iOS).

Such integration tools and automation engines allow for the translation of test scripts to the lower level functionality of the mobile device OS for execution, and for the capture of detailed information (e.g., from Android or iOS logs) reflecting the state of the device, the OS, and/or the AUT. As will be appreciated, such information might include various types of performance data including processor and/or memory usage data. And as with the class of implementations described above for web applications, the information captured by this service may be correlated with other information (e.g., Appium test commands and/or results, video, screen shots, etc.) in a way that enables the developer to better understand the state of the AUT, the device OS, and/or allocated testing resources at various points in time as the automated test is performed.

Whether the test being performed relates to a web application, a mobile-web application, or a mobile native application, the captured information may be downloaded by the developer directly for review, and/or parsed by a dedicated service to support a variety of features that may be exposed via the test console interface.

For example, because the techniques described herein enable the generation of time-correlated data representing the state of the testing resources and/or the AUT at various points over the duration of the test, this enables a navigation functionality in which the developer can navigate (e.g., using a scrubber or other UI control) to any point in a test timeline, see the command being executed, the corresponding result, and any of the information captured via the service (e.g., via browser dev tools, mobile device integration tools, automation engines, etc.), all correlated in time; effectively amounting to a developer "time machine." This might include, for example, screen shots or video that show the state of the UI at any point in the test timeline correlated with commands/results and the corresponding state information. As will be appreciated, using the techniques enabled by the present disclosure, such "time machine" functionality may be provided in the context of a large-scale automated test platform, as well as for much simpler uses cases such as, for example, a single developer performing a local test on a browser or other application.

As will be appreciated from the foregoing, systems and techniques described herein enable the generation of time-series data sets that represent one or more performance metrics over multiple test runs for an AUT. The time-series data for a given performance metric typically include a data point for each test run of a sequence of test runs, although implementations are contemplated in which more or even fewer than one data point per test run might be captured. The test being run (e.g., as represented by a particular test name) and the AUT being tested (e.g., as represented by a particular URL) may be the same versions across the test runs. Alternatively, test results generated using different versions of either or both of the test and the AUT being tested may be included within the same time series. This allows developers to track how a performance metric responds to changes in test code and/or changes in the AUT.

The performance metric that a particular time-series data set represents may vary considerably and may be derived from a variety of sources. For example, in the context of the testing of web applications, time-series data may be derived using any of a variety of automation software and/or testing frameworks including, for example, various automation drivers, Selenium, and WebDriver. Such a test platform might also have access to information such as, for example, HTTP archive (HAR) files (JSON-formatted archive files that log information about a web browser's interaction with a site and that include detailed performance data about the web pages it loads), and/or jsconsole files (files that log information such as network requests, JavaScript, CSS, and security errors and warnings, and messages explicitly logged by JavaScript code). Time-series data may be extracted from any of these sources.

Non-limiting examples of performance metrics in the context of the testing of web applications include metrics relating to network activity. For example, information may be captured that relates to each of the network requests made by an AUT during a test run. In another example, each of the changes in an AUT's layout during a test run may be captured. In another example, each time a particular URL is hit any of the dozens of performance metrics implicated (e.g., time required to fully load a page) may be captured. Any of a variety of browser rendering statistics (e.g., time to first paint, i.e., time required to render the first pixel) that are relevant to front end optimization may be captured. In another example, the time until the first interaction with a page may be captured. In yet another example, a developer might specify start and end points to track and capture various aspects of interactions with pages that are already loaded.

Performance metrics relating to front end optimization in the context of browser-related application testing include page load time, page weight, speed index, time to first byte, first paint, first contentful paint, first meaningful paint, time to interactive, and DOM content loaded. Page load time indicates when the page was completely loaded and started to be interactive. It is fired when a resource and its dependent resources have finished loading.

Page weight, also called "total requests," is an accrual of all a site's resource weights, measured in kilobytes or megabytes, including the HTML of the page itself. It is useful for setting weight budgets on a site, which are easy to pass to developers and designers.

Speed index is a score for the visual completeness of the page above the fold (what's initially visible to the user) over time. It uses video capture to calculate this score. According to one approach speed index is a score from 0 to infinity that maps approximately to milliseconds of time before the page is completely visible to the user.

Time to first byte (TTFB) is a measurement used as an indication of the responsiveness of a web server or other network resource. TTFB measures the duration from the user or client making an HTTP request to the first byte of the page being received by the client's browser.

First paint is the point at which pixels are first drawn on the scene. This metric excludes the default background paint, but does include any user-defined background paint.

First contentful paint is triggered when any content (e.g., an object defined in the Document Object Model (DOM)) is painted. This could be text, an image, or canvas render.

First meaningful paint is a browser-supplied metric that measures how long it takes for the most meaningful content to be fully rendered on the site. It is similar to first-contentful-paint, and describes the duration until the browser first rendered any text, image (including background images), non-white canvas or SVG. This includes text with pending web fonts. It represents the point at which a user can start consuming page content.

Time to interactive is the duration from the time the navigation started until the layout is stabilized, web fonts are visible, and the page is responsive to user input. In one approach, the page is considered stabilized if there was no task blocking for at least 50 ms.

DOM content loaded is an event that is fired when the initial HTML document has been completely loaded and parsed, without waiting for stylesheets, images, and subframes to finish loading.

Still other examples of performance metrics in the context of browser-related application testing may include 'document_count', 'document_size', 'font_count', 'font_size', 'image_count', 'image_size', 'load', 'other_count', 'other_size', 'pageWeightEncoded', 'perceptualSpeedIndex', 'requestsCount', 'requestsSize', 'script_count', 'script_size', 'stylesheet_count', 'stylesheet_size', 'xhr_count', 'xhr_size', among others.

As will be appreciated from the foregoing examples, a wide variety of performance metrics in the context of web application testing may be captured as time-series data.

In the context of the testing of native applications for mobile devices, time-series data may be derived using any of a variety of automation software and/or testing frameworks including, for example, Appium, Espresso, XCUItest (Xcode), and Robotium. Again, as described above, such a test platform might also have access to information captured using integration tools that enable integration with OS automation engines such as, for example, those provided by Google (for Android) and Apple (for iOS). Such integration tools and automation engines allow for the translation of test scripts to the lower level functionality of a mobile device OS for execution, and for the capture of detailed information (e.g., from Android or iOS logs) reflecting the state of the device, the OS, and/or the AUT. Again, time-series data may be extracted from any of these sources.

Non-limiting examples of performance metrics in the context of the testing of native applications for mobile devices include metrics relating to device performance data such as, for example, processor and/or memory usage data. Another example relates to the time it takes to complete specific flows related to the functionality of the AUT, e.g., the time required to render user interface elements responsive to particular UI interactions. Another examples relates to information about what performance mode the mobile device is in (e.g., low battery mode on an iOS device). Yet another example relates to the cellular connection status of the mobile device. Again, it should be appreciated from these examples that a wide variety of performance metrics in the context of mobile application testing may be captured as time-series data.

Figure 4:
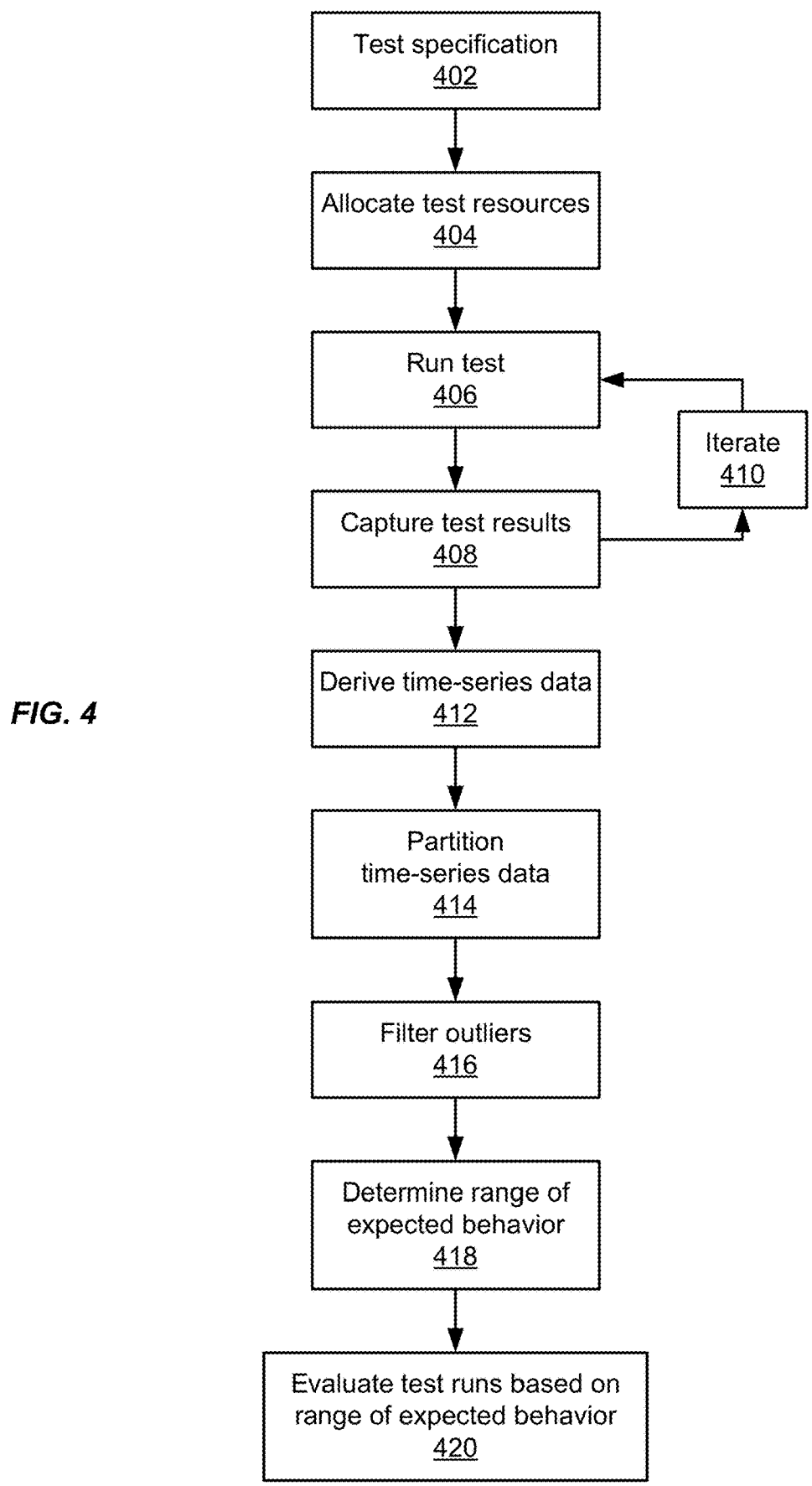
FIG. 4 is a flowchart illustrating operation of a particular implementation.

Regardless of the application testing context or the specific nature of the time-series data captured, testing platforms and frameworks enabled by the present disclosure allow for the reliable identification of data points that deviate from the range of expected behavior, as well as changes in performance that are significant (e.g., relative to a probabilistic distribution), even for relatively noisy data. A particular class of implementations will now be described with reference to the flowchart of FIG. 4. It should be noted that, although the example described assumes that the processing of the time-series data is integrated with the test platform that generates the test results from which the time-series data are derived, implementations are contemplated in which these activities are performed by separate platforms or computing environments which may or may not be controlled by independent entities.

A developer or team of developers specifies a test to be applied to an AUT (402). This might be done, for example, by a developer entering or selecting a test name for the test and a URL for the AUT in a test console interface of a testing platform (e.g., the web interface on laptop 204 of FIG. 2). Test resources of the platform are allocated to the test run (404). This may be done, for example, as described above with reference to FIGS. 1-3. This may involve the allocation of resources associated with any of a variety of automation software and/or testing frameworks. It may also involve allocation of one or more control/capture services (CCSs) that are configured to capture state information associated with other allocated test resources in a way that does not significantly interfere with the tests being conducted.

The test commands of the test are applied (and potentially control over one or more test resources exerted by a CCS) (406), in response to which test results (and potentially state information) are captured (408). This is iterated over a sequence of what may be many test runs (410). According to some implementations, at least 10 to 20 test runs (or data points) for each performance metric is considered a sufficient time series for proceeding.

Time-series data for one or more performance metrics are derived for the sequence of test runs (412). As mentioned above, the sequence of test runs from which the time-series data are derived may be identified based on the test name and the URL (or set of URLs) associated with the AUT. This would allow for variation of both the test code and/or the AUT over the sequence of test runs. However, other ways of identifying test runs that can be grouped together for this purpose are contemplated. For example, a developer might be given the option of manually grouping test runs for the purpose of generating time-series data even where test names and/or AUT URL(s) are not the same. In another example, a developer might be able to specify the environment in which the AUT is running (e.g., dev, staging, performance, etc.) as these could have relevant performance differences.

Time-series data for any given metric may be extracted in parallel with the test runs, e.g., a data point at a time. Alternatively, the time-series data may be extracted from the test results of a sequence of test runs after the sequence has been completed and/or the test runs grouped together. In some cases, time-series data for many performance metrics may be automatically extracted without input from the developer. Alternatively, the developer may specify particular metrics in advance for which time-series data are desired.

The range of variation in the manner in which test runs may be grouped and/or time-series data extracted will be appreciated by those of skill in the art.

Once time-series data for a given performance metric are obtained, the time-series data for that metric are partitioned into one or more partitions or regimes (414). According to a particular class of implementations, this partitioning is done using change-point detection to identify one or more ranges of the time-series data belonging to a corresponding probabilistic distribution. According to this approach, a search is performed through different proposed partitions of the time-series data. The search iterates through the different proposed partitions and attempts to minimize a cost function. These iterations involve placing proposed changes points in the data and evaluating the difference between the probabilistic distribution of the proposed partition on one side of the proposed change point and the probabilistic distribution of the proposed partition on the other. The less overlap there is between the two proposed partitions, the better the score for that proposed change point.

According to a particular implementation, change-point detection is done using the Pruned Exact Linear Time (PELT) method as described, for example, in *Optimal Detection of Changepoints with a Linear Computational Cost*, R. Killick, P. Fearnhead, and I. A. Eckley, document 1101.1438 in Cornell University's arXiv.org (Oct. 10, 2012), the entire disclosure of which is incorporated herein by reference. However, it will be understood that other approaches to change-point detection may be used without departing from the scope of this disclosure. Other approaches include Binary Segmentation (Scott and Knott, 1974), Segment Neighborhood (Auger and Lawrence, 1989), and Optimal Partitioning (Jackson et al., 2005), to name some representative examples.

A benefit of using change-point detection in this context is that, despite the noisy data, it can result in a relatively high level of confidence that different partitions of time-series data belong to different probabilistic distributions, i.e., that a real change in performance has been detected. This is to be contrasted with approaches that rely on thresholds that are based on developer intuition and/or a historically observed variance of the time series. In such approaches, outlier data points trigger alerts that might lead to an erroneous conclusion that meaningful change has occurred. In addition, in conventional approaches, outliers can have undesirable effects on the variance estimates on which the thresholds are based, leading to unreliable results.

Referring again to FIG. 4, once the time-series data have been partitioned, outlier filtering is performed in each partition (416). This may be done using any of a variety of filtering techniques such as, for example, interquartile range filtering. Because of the partitioning of the time-series data, this filtering may be done with confidence. That is, the use of change-point detection provides a level of confidence that each partition or regime of the time-series data conforms to a particular distribution. As such, data points within a partition but outside the distribution can be confidently filtered without being concerned that the filtered data point is actually a new point in a new regime, i.e., a data point that is informative of a new pattern in the test's or the AUT's performance.

A range of expected behavior (i.e., a confidence interval) is then determined for each partition using the remaining data points for the partition (418). According to a particular implementation, the range of expected behavior is a standard deviation band calculated using the remaining data points of the partition. Other approaches to determining this range are also contemplated, e.g., percentile based ranges. This range is something developers can then use to determine whether the behavior of any given test run or set of test runs is outside the baseline represented by the partition of which it is a member (420). According to various implementations, the range can be used in different ways.

For example, once a range of expected behavior is determined, test runs belonging to that partition can be evaluated based on the determined range to identify both data points that are outside of that range, as well as data points that could potentially represent significant change from the probabilistic distribution to which the range corresponds. The range can be used to provide a lower priority warning system that flags data points a developer might want to investigate, but raises a higher priority alert when a potential change point is identified; the latter presumably being rarer than the data points that are simply outside of the range.

According to a particular implementation, when a potential new change point is identified, a notification is surfaced to the developer (e.g., in the test console interface or via an API). The developer might also be given the option of integrating the new change point into the historical framework (and adjusting the range of expected behavior accordingly). Alternatively, the developer might decide that the potential change point represents a true anomaly or problem. That is, if the developer acknowledges the new change point, the range of expected behavior for the new partition defined by the change point can be used to generate the default expected range for future test runs for the corresponding metric. On the other hand, if the developer chooses not to acknowledge or accept the detected change point, the prior range for the metric will continue to be used, and the developer might investigate and/or fix the problem that caused the change to occur.

Because the old baseline persists unless a new one has been accepted, points that are out of the baseline will be identified as a "failed" performance test, unless the developer decides to treat the new, out-of-range behavior as a "new normal" by accepting it as part of a new baseline. Thus, isolated outliers will fail the test, but because the next run is very likely to be within baseline again, will not trigger a changepoint detection.

Implementations are contemplated in which time-series data are generated and processed for each performance metric as described herein every time a test completes. Such an approach would be useful for supporting the use of push notifications to alert developers of events of interest. However, as such an approach might result in a large number of calculations that would not be of interest to developers, implementations are also contemplated in which the time-series data are captured and/or processed on demand. Such an approach would be useful for supporting requests from developers for specific information. Still other implementations employ an asynchronous approach in which the calculations are triggered in the background and the results surfaced to the test console interface when ready. Regardless of which approach is taken, developers may also be given the option of identifying specific performance metrics for a given combination of test and AUT for which the calculations should be performed.

It will be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A platform, comprising one or more computing devices including one or more processors and memory configured to:
conduct a plurality of first test runs of one or more versions of a test for one or more versions of an application under test (AUT) by allocating computing resources;
receive first time-series data, the first time-series data including a data point representing a first performance metric for each of the first test runs;
partition the first time-series data into one or more partitions using change-point detection, each partition representing a corresponding range of the first time-series data belonging to a corresponding probabilistic distribution;
filter outliers of the data points in each partition, thereby resulting in remaining data points in each partition;
determine a range of expected behavior for the first performance metric for a first partition of the one or more partitions using the remaining data points of the first partition; and
evaluate a plurality of second test runs based on the range of expected behavior for the first partition.

2. The platform of claim 1, wherein the one or more processors and memory of the one or more computing devices are further configured to:
receive second time-series data for the AUT, the second time-series data including a data point representing the first performance metric for each of the second test runs; and
identify one or more data points of the second time-series data that depart from the range of expected behavior for the first partition.

3. The platform of claim 2, wherein the one or more processors and memory of the one or more computing devices are further configured to identify a change-point candidate from among the one or more data points of the second time-series data that depart from the range of expected behavior for the first partition.

4. The platform of claim 3, wherein the one or more processors and memory of the one or more computing devices are further configured to:
identify a second partition of the second time-series data based on the change-point candidate;
determine a range of expected behavior for the first performance metric for the second partition; and
evaluate a plurality of third test runs based on the range of expected behavior for the second partition.

5. The platform of claim 1, wherein the one or more processors and memory of the one or more computing devices are configured to filter the outliers of the data points in each partition using interquartile range filtering.

6. The platform of claim 1, wherein the one or more processors and memory of the one or more computing devices are configured to determine the range of expected behavior for the first performance metric for the first partition by determining a standard deviation band based on the remaining data points.

7. The platform of claim 1, wherein the computing resources include a plurality of virtual computing environment (VCE) instances, each VCE instance corresponding to a device operating system (OS).

8. The platform of claim 7, wherein the device OS for a first VCE instance is a personal computer OS, and wherein the first VCE instance also corresponds to a web browser configured to interact with a corresponding instance of the AUT.

9. The platform of claim 8, wherein the one or more processors and memory of the one or more computing devices are configured to conduct the plurality of first test runs by applying control commands to the web browser, and wherein the first time-series data represent a state of the web browser received from the web browser via an application programming interface associated with the web browser.

10. The platform of claim 7, wherein the device OS for a first VCE instance is a mobile device OS, and wherein the first VCE instance also corresponds to a hardware device configured to operate with the mobile device OS.

11. The platform of claim 10, wherein the first VCE instance also corresponds to a web browser configured to interact with a corresponding instance of the AUT.

12. The platform of claim 11, wherein the one or more processors and memory of the one or more computing devices are configured to conduct the plurality of first test runs by applying control commands to the web browser, and wherein the first time-series data represent a state of the web browser received from the web browser via an application programming interface associated with the web browser.

13. The platform of claim 10, wherein the AUT is a native application configured to operate with the mobile device OS, and wherein the first time-series data represent one or both of a state of the native application or a state of the mobile device OS.

14. The platform of claim 10, wherein the first time-series data represent one or both of a state of the hardware device or a state of the mobile device OS.

15. The platform of claim 7, wherein the device OS for a first VCE instance is a mobile device OS, and wherein the first VCE instance also corresponds to a mobile device emulator configured to emulate the mobile device OS.

16. The platform of claim 15, wherein the first VCE instance also corresponds to a web browser configured to interact with a corresponding instance of the AUT.

17. The platform of claim 16, wherein the one or more processors and memory of the one or more computing devices are configured to conduct the plurality of first test runs by applying control commands to the web browser, and wherein the first time-series data represent a state of the web browser received from the web browser via an application programming interface associated with the web browser.

18. The platform of claim 15, wherein the AUT is a native application configured to operate with the mobile device OS, and wherein the first time-series data represent one or both of a state of the native application or a state of the mobile device OS.

19. The platform of claim 15, wherein the first time-series data represent one or both of a state of the mobile device emulator or a state of the mobile device OS.

20. A computer program product, comprising one or more non-transitory computer-readable media having computer program instructions stored therein, the computer program instructions being configured such that, when executed by one or more computing devices, the computer program instructions cause the one or more computing devices to:
conduct a plurality of first test runs of one or more versions of a test for one or more versions of an application under test (AUT) by allocating computing resources;
receive first time-series data, the first time-series data including a data point representing a first performance metric for each of the first test runs;

partition the first time-series data into one or more partitions using change-point detection, each partition representing a corresponding range of the first time-series data belonging to a corresponding probabilistic distribution;

filter outliers of the data points in each partition, thereby resulting in remaining data points in each partition;

determine a range of expected behavior for the first performance metric for a first partition of the one or more partitions using the remaining data points of the first partition; and evaluate a plurality of second test runs based on the range of expected behavior for the first partition.

21. The computer program product of claim 20, wherein the computer program instructions are further configured to cause the one or more computing devices to:

receive second time-series data for the AUT, the second time-series data including a data point representing the first performance metric for each of the second test runs; and identify one or more data points of the second time-series data that depart from the range of expected behavior for the first partition.

22. The computer program product of claim 21, wherein the computer program instructions are further configured to cause the one or more computing devices to identify a change-point candidate from among the one or more data points of the second time-series data that depart from the range of expected behavior for the first partition.

23. The computer program product of claim 22, wherein the computer program instructions are further configured to cause the one or more computing devices to:

identify a second partition of the second time-series data based on the change-point candidate;

determine a range of expected behavior for the first performance metric for the second partition; and evaluate a plurality of third test runs based on the range of expected behavior for the second partition.

24. The computer program product of claim 20, wherein the computer program instructions are configured to cause the one or more computing devices to filter the outliers of the data points in each partition using interquartile range filtering.

25. The computer program product of claim 20, wherein the computer program instructions are configured to cause the one or more computing devices to determine the range of expected behavior for the first performance metric for the first partition by determining a standard deviation band based on the remaining data points.

\* \* \* \* \*